US012636525B2

(12) United States Patent
Azar et al.

(10) Patent No.: US 12,636,525 B2
(45) Date of Patent: May 26, 2026

(54) FACE MASK

(71) Applicant: Meacor, Inc., Irvine, CA (US)

(72) Inventors: Toufic Azar, Montreal (CA); Renzo Cecere, Mont-Royal (CA); Anthony Eid, Bsaba (LB); Omar Labban, Beirut (LB)

(73) Assignee: Meacor, Inc., Irvine, CA (US)

( * ) Notice: Subject to any disclaimer, the term of this patent is extended or adjusted under 35 U.S.C. 154(b) by 1033 days.

(21) Appl. No.: 17/701,384

(22) Filed: Mar. 22, 2022

(65) Prior Publication Data

US 2022/0347500 A1 Nov. 3, 2022

Related U.S. Application Data

(60) Provisional application No. 63/183,369, filed on May 3, 2021.

(51) Int. Cl.

| | |
|---|---|
| ***A62B 23/02*** | (2006.01) |
| ***A41D 13/11*** | (2006.01) |
| ***A62B 18/08*** | (2006.01) |

(52) U.S. Cl.

CPC ............ *A62B 23/025* (2013.01); *A41D 13/11* (2013.01); *A62B 18/084* (2013.01)

(58) Field of Classification Search

CPC ..... A62B 23/025; A62B 18/084; A62B 18/08; A41D 13/11; A41D 13/1115; A41D 13/1123; A41D 13/1146; A41D 13/1184; A41D 13/1192; A41D 13/1138; A41D 13/113; A41D 13/1107; A41D 13/1161; A41D 13/1176; A61M 16/0605–0627; A61M 2016/0661

See application file for complete search history.

(56) References Cited

U.S. PATENT DOCUMENTS

| | | | | |
|---|---|---|---|---|
| 2005/0284477 | A1* | 12/2005 | Schrader | A61M 16/0616 128/205.25 |
| 2007/0113853 | A1* | 5/2007 | Pavesi | A62B 9/003 128/205.25 |
| 2018/0256926 | A1* | 9/2018 | Kyung | A62B 18/10 |
| 2019/0009114 | A1* | 1/2019 | Han | A41D 1/002 |
| 2021/0329995 | A1* | 10/2021 | Dietz | A62B 18/025 |
| 2023/0166136 | A1* | 6/2023 | Jones | A41D 13/1115 128/206.19 |

* cited by examiner

*Primary Examiner* — Rachel T Sippel
*Assistant Examiner* — Gwynneth L Howell
(74) *Attorney, Agent, or Firm* — William A. English; Vista IP Law Group LLP

(57) ABSTRACT

A face mask including shape memory materials to improve fit to the face and/or create a cavity in front of the mouth to facilitate breathing.

18 Claims, 6 Drawing Sheets

FACE MASK

FIELD OF THE INVENTION

The present invention relates to the general field of personal protection equipment, and is more particularly concerned with a face mask.

BACKGROUND

There are many types of face masks used to protect their intended users from inhalation of harmful particles. One common type of such masks includes a relatively rigid shell made of a filtering material secured with straps over the mouth and nose of their users, for example masks meeting the N95 or KN95 norms. Such masks are relatively difficult to wear properly as their rigidity can result in poor fit to the face, which can let air infiltration enter the mask at the mask/skin interface, with obvious reduction in filtering performance of the mask. This rigidity can also result in discomfort when the mask is worn for long periods of time.

Another type of mask is made of one or more fabric layers and held over the nose and mouth of the user using straps. Such masks are usually more comfortable to wear than the rigid masks described above, but typically present worse seal performance at the mask/skin interface. Also, such masks have a tendency to collapse towards the face during inhalation, which can lead to discomfort and also to a large reduction in the surface area of the mask that is used to draw air in the lungs of the wearer, making breathing more difficult.

Both types of mask tend to fog eyeglasses that may be worn by their users during expiration as improper fit to the nose area can lead to large quantities of warm moist air to be directed directly in front of the eyes of the user, which can then condensate on the relatively colder surface of the eyeglasses.

Accordingly, there exists a need for improved face masks. An object of the invention is to provide such face masks.

SUMMARY OF THE INVENTION

In a broad aspect, there is provided a face mask for covering a nose and a mouth part of a face of an intended user, the face mask comprising a body configured to cover the nose and the mouth when the face mask is operatively worn over the face, the body defining a mouth portion and an adjacent nose portion configured and sized to respectively cover the mouth and nose of the intended user when the face mask is operatively worn by the intended user, the body defining a body peripheral edge; a fitting frame extending along at least part of the body peripheral edge, the fitting frame being heat activated and configured to contract against the face in response to receiving heat from the face when the face mask is operatively worn by the intended user; and a spacing frame provided in the mouth portion, the spacing frame being heat activated to achieve a spacing frame activated configuration in which the mouth portion forms a cavity in front of the mouth in response to receiving warm air blown thereonto.

In another broad aspect, there is provided a face mask for covering a nose and a mouth part of a face of a head of an intended user, the face mask comprising: a body defining a mouth portion and a nose portion extending therefrom for respectively covering the mouth and the nose of the intended user when the face mask is operatively worn by the intended user, the body defining a body peripheral edge, the body including a deformable and flexible material; support straps extending from the body and configured for mounting the body to the head of the intended user; and a frame member mounted to the body, the frame member being made of a temperature sensitive shape memory material, the frame member being configured for deforming the deformable and flexible material so that at least part of the body adopts a predetermined shape when the frame member is heated over a predetermined transition temperature.

There may also be provided a face mask wherein the frame member is part of a fitting frame extending along at least part of the body peripheral edge, the fitting frame being heat activated and configured to contract against the face in response to receiving heat from the face when the face mask is operatively worn by the intended user and the fitting frame is heated above the predetermined transition temperature.

There may also be provided a face mask wherein the fitting frame includes two similar copies of the frame member mounted in a lateral mirror symmetry to the body with gaps therebetween both at a top portion of the mask and at a bottom portion of the mask.

There may also be provided a face mask further comprising a resiliently deformable link extending between the frame members along the body peripheral edge in the nose portion.

There may also be provided a face mask wherein the frame members together extend along a major portion of the body peripheral edge.

There may also be provided a face mask wherein the body peripheral edge defines peripheral edge nose, cheek and chin portions abutting respectively against the nose, cheeks and chin of the face of the intended user when the face mask is operatively worn by the intended user, the fitting frame being configured to create a seal between the face mask and the face when the fitting frame is heated above the predetermined transition temperature.

There may also be provided a face mask wherein the frame member is part of a spacing frame provided at least in part in the mouth portion, the spacing frame being heat activated to achieve a spacing frame activated configuration in which the mouth portion forms a cavity in front of the mouth in response to receiving warm air exhaled by the intended user while the face mask is worn, causing the fitting frame to be heated above the predetermined transition temperature.

There may also be provided a face mask therein the frame member is arcuate in the spacing frame activated configuration.

There may also be provided a face mask wherein the body includes an inner layer, an outer layer, and a filter layer between the inner and outer layers, the filter layer being less permeable to particulates than the inner and outer layers.

There may also be provided a face mask wherein the inner and outer layer are movable relative to each other to allow replacement of the filter layer from between the inner and outer layers.

There may also be provided a face mask wherein the inner and outer layers are hinged to each other through a hinge provided at the body peripheral edge and detached from each other along the body peripheral edge outside of the hinge.

There may also be provided a face mask wherein the inner and outer layers are detached from each other.

There may also be provided a face mask wherein the body is made entirely of the deformable and flexible material.

There may also be provided a face mask wherein the deformable and flexible material includes a fabric.

There may also be provided a face mask wherein the shape memory material is a nickel-titanium alloy.

There may also be provided a face mask wherein the frame member is a fitting frame member part of a fitting frame extending along at least part of the body peripheral edge, the fitting frame being heat activated and configured to contract against the face in response to receiving heat from the face when the face mask is operatively worn by the intended user and the fitting frame is heated above the predetermined transition temperature; the face mask further comprising a spacing frame member part of a spacing frame provided in the mouth portion, the spacing frame being heat activated to achieve a spacing frame activated configuration in which the mouth portion forms a cavity in front of the mouth in response to receiving warm air exhaled by the intended user while the face mask is worn, causing the fitting frame to be heated above the predetermined transition temperature.

In yet another broad aspect, there is provided a method of using a face mask to be worn over a face of a head of an intended user, the method comprising: positioning the face mask in front of the face to cover a nose and a mouth of the intended user; and using heat provided by the intended user, deforming a shape memory member part of the face mask so that a portion of the face mask adopts a predetermined shape.

There may also be provided a method wherein deforming the shape memory member creates a cavity in front of the mouth and nostrils of the intended user.

There may also be provided a method wherein deforming the shape memory member biases a peripheral edge of the face mask against the face to create a seal between the face mask and the face.

There may also be provided a method further comprising removing a filter part of the face mask; washing the face mask; and mounting a new filter to the face mask after washing.

Advantageously, the fitting frame helps in achieving proper seal between the face and the face mask, thereby improving the performance of the face mask relative to many existing masks without requiring extensive training by the intended user. The spacing frame also helps in maintaining a hollow cavity in front of the mouth and nose of the intended user, so that air can enter the face mask and then the lungs of the user through all or most of the face mask's surface. Also, due to the tight fit provided by the face mask, lower strap tensions can be used in the straps that maintain the face mask on the face, resulting in increased comfort. The use of a shape memory material allows to achieve these advantages while facilitating storage of the face masks flat against each other, for example in a box. the face masks therefore require a relatively small storage volume, and adopt their more complex tridimensional structure only when in use.

In some embodiments, the fitting and spacing frames are made of a shape memory material, for example of a nickle titanium alloy. Such materials are particularly advantageous as they can be deformed to great extent during manufacturing and storage without being damaged and while preserving their ability to achieve a predetermined shape once heated above their transition temperature.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
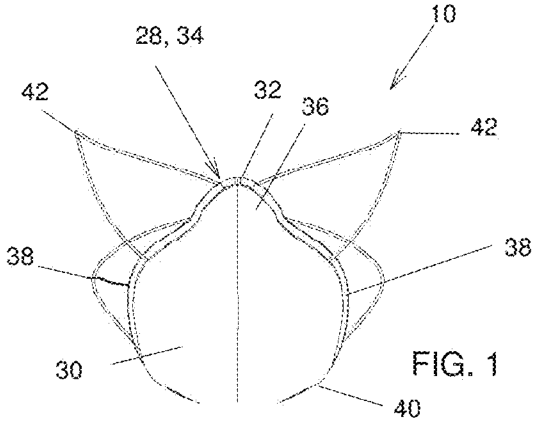
FIG. 1, in a front elevation view, illustrates a face mask in accordance with an embodiment of the present invention, the face mask including a body and straps for mounting the body to a head.
Figure 10:
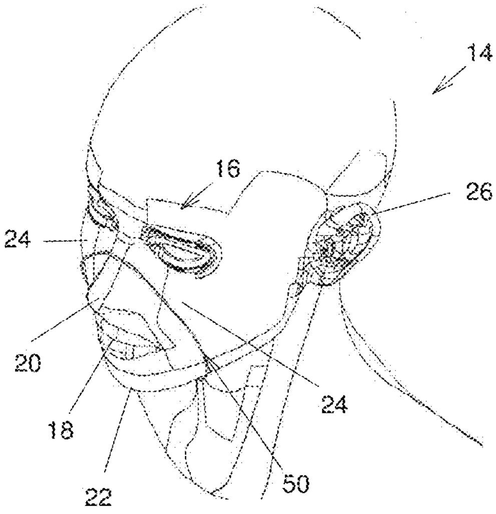
FIG. 10, in a perspective view, illustrates a fitting frame part of the outer shell of FIG. 9 positioned adjacent the face of the intended in an unfitted configuration.

With reference to FIG. 1, there is shown a face mask 10 in accordance with an embodiment of the present invention. The face mask 10 is usable by an intended user 12 having a head 14 (seen in FIG. 2). As better seen in FIGS. 10 and 11, the head 14 includes a face 16 having a mouth 18, a nose 20, a chin 22 and cheeks 24. The head 14 also includes two ears 26, only one of which is seen in FIG. 10. The face mask 10 is usable for covering the nose 20 and mouth 18 of the intended user 12.

Figure 2:
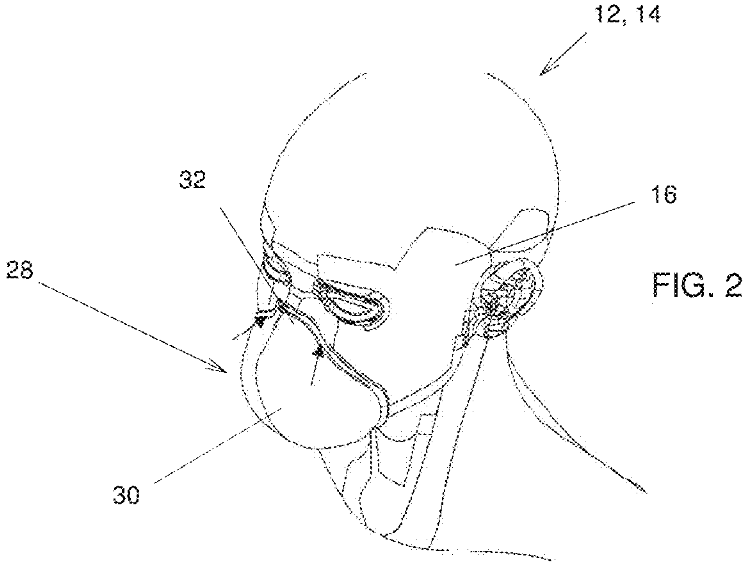
FIG. 2, in a perspective view, illustrates the body of the face mask of FIG. 1 fitted on a face of an intended user.

Returning to FIG. 1, the face mask 10 includes a body 28 configured to cover the nose 20 and the mouth 18 when the face mask 10 is operatively worn over the face 16 in the manner seen in FIG. 2. As such, the body 28 defines a mouth portion 30 and a nose portion 32 extending therefrom. The mouth and nose portions 30 and 32 are configured and sized to respectively cover the mouth 18 and nose 20 of the intended user 12, and portions of the face 16 adjacent thereto, when the face mask 10 is operatively worn by the intended user 12.

The body 28 defines a body peripheral edge 34. The body peripheral edge 34 includes a peripheral edge nose portion 36 from which two peripheral edge cheek portions 38 extend, which are joined to each other by a peripheral edge chin portion 40 opposed to the peripheral edge nose portion 36. The peripheral edge nose, cheek, and chin portions 36, 38 and 40 abut respectively against the nose 20, cheek 24 and chin 22 when the face mask 10 is properly fitted to the face 16 to form a seal between the face mask 10 and the face 16. Accordingly, all or substantially air entering the nose 20 and mouth 18 had to be filtered by the face mask 10, which then has an opportunity if including the right materials to reduce or prevent inhalation of most or all particles above a predetermined size. The body 28 includes a deformable and flexible material, for example fabric or a material having similar properties. Typically, all of the body 28 or substantially all the body 28 is made of fabric.

The face mask 10 also includes one or more support straps 42 extending from the body 28 to support the body 28 on the head 14 without requiring outside intervention. The straps 42 may include for example two elongated straps 42 mounted to the body 28 at both ends thereof on opposite sides of the body 28 and secured to each other in their middle portion, so as to define an "8", or infinity symbol, shape together and with the body peripheral edge 34. For example, the straps 42 have one end thereof mounted to the body 28 adjacent or at a junction between the peripheral edge nose and cheek portions 36 and 38 and the other end thereof mounted to the body 28 adjacent or at a junction between the chin and cheek portions 40 and 38. However, other configurations of straps are usable, such as, non-limitingly, one or more straps that wrap substantially horizontally around the head 14, or straps that are configured to wrap around the ears 26.

As detailed below, the proposed face mask 10 includes a frame member 54 or 56 mounted to the body 28. The frame member 54 or 56 is made of a temperature sensitive shape memory material. The frame member 54 or 56 is configured for deforming the deformable and flexible material so that at least part of the body 28 adopts a predetermined shape when the frame member 54 or 56 is heated over a predetermined transition temperature.

Figure 3:
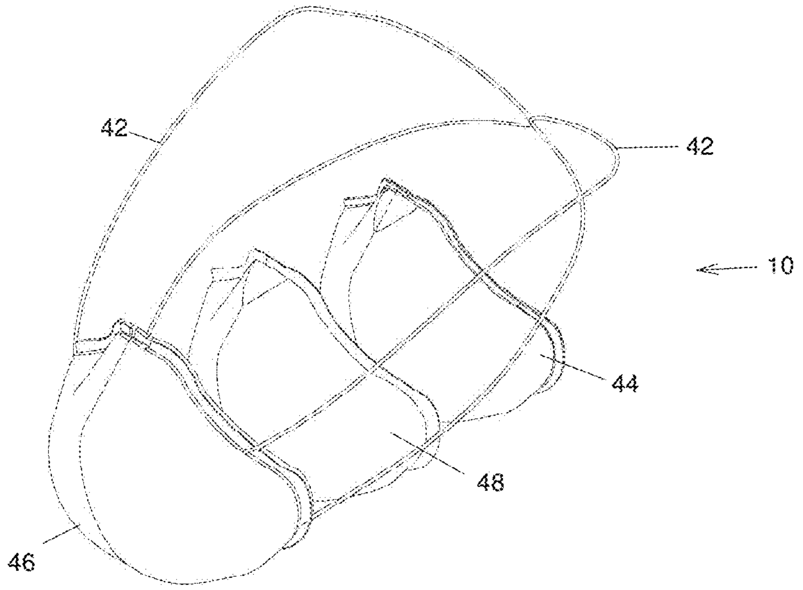
FIG. 3, in an exploded view with hidden components not shown, illustrates the face mask of FIG. 1.

Referring to FIG. 3, the face mask 10 includes an inner layer 44, an outer layer 46 and a filter layer 48 sandwiched therebetween. The filter layer 48 is less permeable to particulates than the inner and outer layers 44 and 46. In some embodiments, the inner, outer and filter layers 44, 46 and 48 have substantially similar dimensions and configurations, but this is not required in all embodiments. For example, the inner layer 44" shown in FIG. 8 covers only part of the outer and filter layers 46 and 48.

Figure 5:
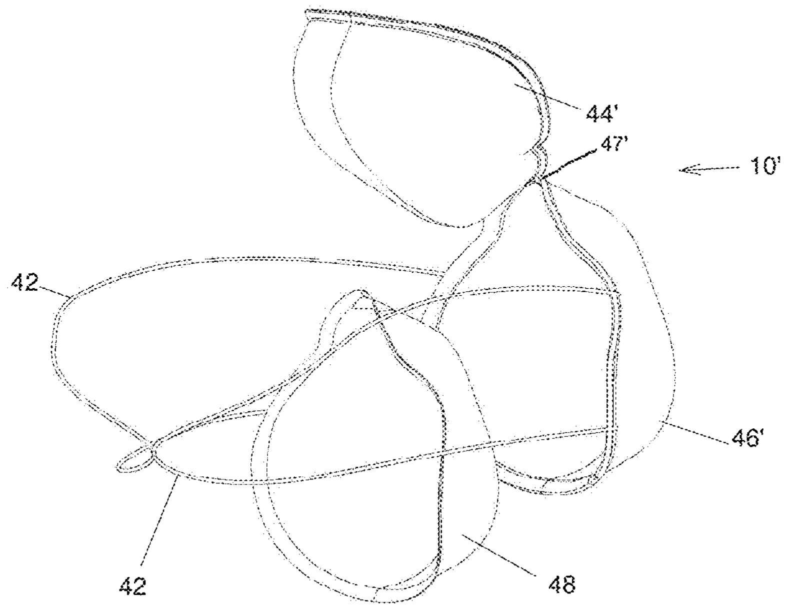
FIG. 5, in an exploded view, illustrates an alternative embodiment of a face mask.

In some embodiments, the filter layer 48 may be replaceable easily by having the inner and outer layers 44 and 46 movable relative to each other, but filter layers 48 that are not easily replaceable are used in other embodiments. For example, the inner and outer layers 44 and 46 are removably attached to each other, for example using Velcro™ or other attachment methods, or simply mounted to each other without attachment and simply maintained in place when the face mask 10 is worn by the pressure exerted by outer layer 46 on the face 16 due to the straps 42. In other embodiments, as seen in the face mask 10' of FIG. 5, the inner and outer layers 44' and 46' are hinged to each other through a hinge 47' at the body peripheral edge 34 and detached from each other along the body peripheral edge 34 outside of the hinge 47, so as to allow selective insertion and removal of the filter layer 48. To that effect, the inner and outer layer 44' and 46' may achieve an open configuration, seen in FIG. 5 in which such insertion and removal of the filter layer 48 is possible, and a closed configuration in which the filter layer 48 is sandwiched between the inner and outer layers 44' and 46', which which the face mask 10' looks like the face mask 10 as shown in FIG. 1 for example. In other embodiments, the inner and outer layers 44 and 46 are secured to each other along a major portion of the body peripheral edge 34 and a small slit is provided, extending for example between 5 and 15 percent of the body peripheral edge 34, which allows insertion of the filter layer 48 between the inner and outer layers 44 and 46 and removal therefrom.

Therefore, the inner and outer layers 44 and 46 and the straps 42 can be made of easily washable materials, for example of a silk and cotton blend and of an elastic polymeric material respectively, which allows reuse of most of the face mask 10, and the filter layer 48 can be replaced after each use, or after a predetermined number of uses, and can be optimized for its filtering ability without having to be washable. However, in alternative embodiments, a similar use of a shape memory material can be made in a single use mask or in a silicone mask, among other possibilities.

Figure 4:
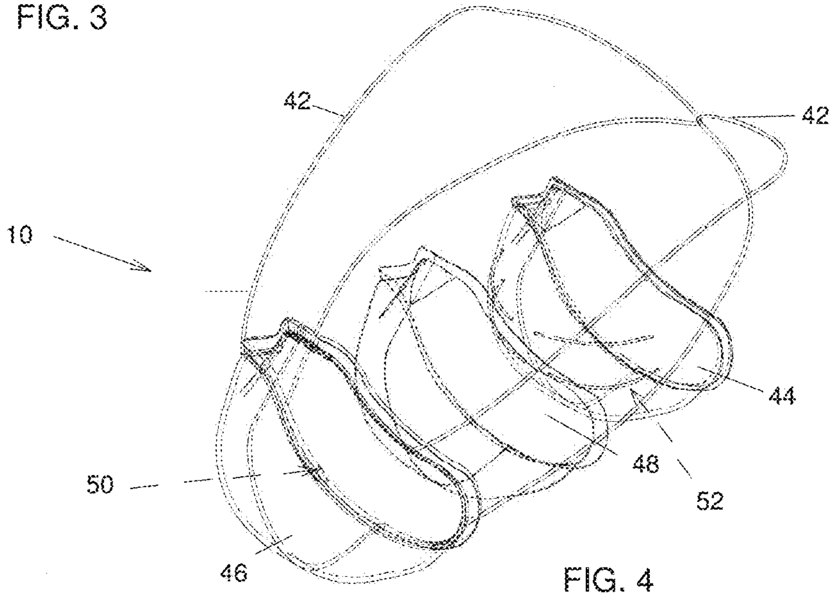
FIG. 4, in an exploded view with hidden components shown, illustrates the face mask of FIG. 1.

Referring to FIG. 4, the face mask 10 includes a fitting frame 50 extending along at least part of the body peripheral edge 34 and a spacing frame 52 extending at least in part in the mouth portion 30. The fitting and spacing frames 50 and 52 are heat activated so as to achieve respectively predetermined fitting and spacing configurations when heated above respective predetermined fitting and spacing temperatures corresponding to a transition temperature of the material from which the fitting and spacing frames are made. In some embodiments, the fitting and spacing temperatures are within an interval of from about 28° C. to about 34° C., but other values for these parameters are possible, depending on the environmental conditions in which the face mask 10 is to be used. The fitting and spacing temperatures may be identical or may differ from each other.

The fitting configuration is such that it conforms to the shape of the face 16 to provide a seal between the face mask 10 and the face 16 when the face mask 10 is abutted against the face 16 in response to heat provided by the skin of the face 16. To that effect, the fitting frame 50 is heat activated and configured to contract against the face 16 in response to receiving heat from the face 16 when the face mask 10 is operatively worn by the intended user 12 and the fitting frame 50 is heated above a predetermined transition temperature corresponding to the fitting temperature. The spacing configuration is such that the body 28, which may be made at least in part from a flexible material, remains spaced apart from the mouth 18 when the intended user 12 inspires by defining a cavity in the face mask 10 in front of the mouth

18. The spacing configuration may be achieved when heat is transferred by exhaled air upon the intended user expiring into the face mask 10. In some embodiments, in the spacing configuration, the cavity is formed such that the face mask 10 is deformed towards the face in the nose portion 30. This will assist redirection of expired air away from the eyes of the intended user 12 to reduce fogging in any eyewear worn by the intended user 12.

In the face mask 10, the fitting and spacing frames 50 and 52 each include one or more frame members 54 and 56 respectively, as further described hereinbelow. For example, the frame members 54 and 56 are each made of a shape memory material that achieves a predetermined shape when heated above a transition temperature. An example of a suitable material is a nickel-titanium alloy of the type commercially known as Nitinol™, but other materials, such as other shape memory alloys or shape memory polymers are usable. The frame members 54 of the fitting frame 50 are typically mounted to the outer layer 46, while the frame members 56 of the spacing frame 52 are typically mounted to the inner layer 44. The frame members 54 and 56 may be connected to each other or distanced from each other. As such, the fitting and spacing frames 50 and 52 may form a continuous structure, or an open structure in which the frame members 54 and 56 don't contact each other directly, but instead act as structural members mounted to a more easily deformable fabric. In some embodiments, the frame members 54 and 56 are superelastic.

In alternative embodiments, the face mask 10 may be made of a single layer of material, in which case the fitting and spacing frames 50 and 52 are mounted to this single layer. Also, the fitting and spacing frames 50 and 52 may be mounted in any suitable manner to the body 28 at any suitable location, as long as their function can be performed. Furthermore, in some embodiments, only one of the fitting and spacing frames 50 and 52 is provided.

Figure 6:
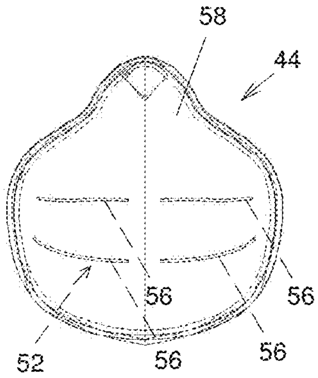
FIG. 6, in a front elevation view, illustrates an inner shell part of the body of the face mask of FIG. 1.

The inner layer 44 is now described in further details with reference to FIG. 6. The inner layer 44 includes an inner layer body 58 made of a flexible material, such as a fabric, and the spacing frame 52 mounted thereto. The spacing frame 52 includes four similar or identical frame members 56 mounted so as to be substantially horizontal when the face mask 10 is worn by an upstanding intended user 12, although the number, position, and configuration of the frame members 56 may vary in alternative embodiments. The frame members 56 are mounted in a 2×2 grid so as to be pairwise vertically and horizontally spaced apart from each other. The frame members 56 may be sewn or otherwise secured, using for example an adhesive, to the inner layer body 58. The frame members 56 may be mounted on the surface of the inner layer body 58, and as such exposed, or they may be embedded in the inner layer body 58. The inner layer body 58 may be hemmed.

Figure 16:
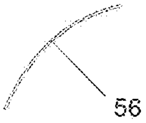
FIG. 16, in a top elevation view, illustrates the frame member of FIG. 15 in a spacing configuration.

The frame members 56 achieve a spacing configuration when heated above a predetermined spacing temperature, that is for example about 30° C. As seen in FIG. 16, in the spacing configuration, the frame members 56 are curved, or arcuate, achieving for example a configuration similar to a segment of an ellipse or a circle, or any other suitable shape. Due to their link with the inner layer body 58, the frame members 56 will create a cavity adjacent the mouth 18 when the spacing configuration is achieved by shaping the flexible inner layer body 58.

Figure 15:
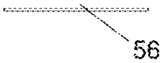
FIG. 15, in a top elevation view, illustrates a frame member part of a spacing frame part of the inner layer of FIG. 6.
Figure 21:
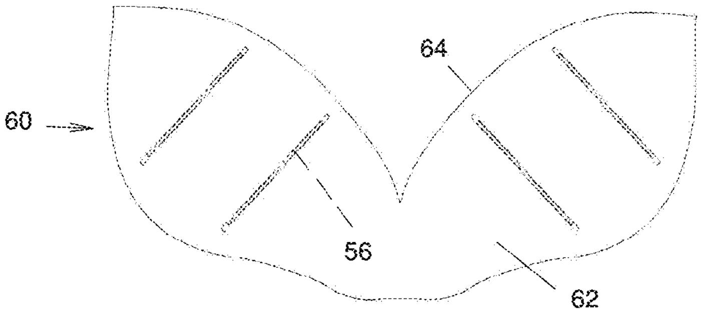
FIG. 21, in a top elevation view, illustrates a blank usable to manufacture the inner layer of FIG. 6.

FIG. 21 illustrates a blank 60 usable to manufacture the inner layer 44. The blank 60 includes a fabric body 62 to which the frame members 56 are mounted. For example, the frame members 56 are substantially rectilinear, as seen in FIG. 15, prior to mounting. The frame members 56 have been trained to achieve the proper shape when in the spacing configuration prior to being straightened for mounting to the fabric body 62. Part of the periphery of the fabric body 62 is a junction edge 64 that is folded over itself and sewn or otherwise secured in this folded configuration to form the inner layer 44 from the blank 60.

Figure 7:
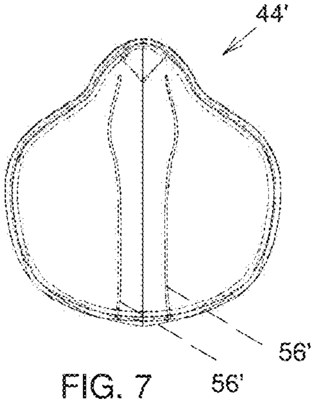
FIG. 7, in a front elevation view, illustrates an alternative inner shell usable in the face mask of FIG. 1.
Figure 8:
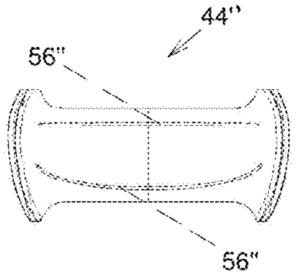
FIG. 8, in a front elevation view, illustrates an other alternative inner shell usable in the face mask of FIG. 1.
Figure 18:
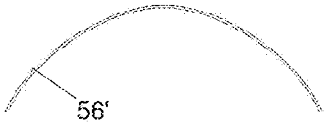
FIG. 18, in a top elevation view, illustrates the frame member of FIG. 17 in a spacing configuration.
Figure 17:
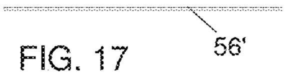
FIG. 17, in a top elevation view, illustrates a frame member part of a spacing frame part of the inner layer of FIG. 8.
Figure 20:
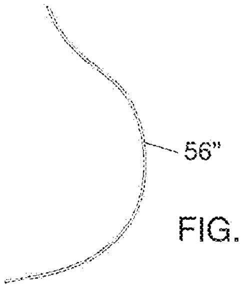
FIG. 20, in a side elevation view, illustrates the frame member of FIG. 19 in a spacing configuration.
Figure 19:
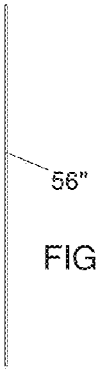
FIG. 19, in a side elevation view, illustrates a frame member part of a spacing frame part of the inner layer of FIG. 7.
Figure 23:
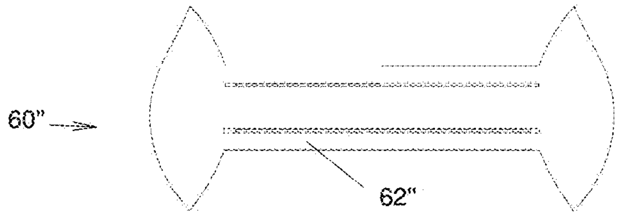
FIG. 23, in a top elevation view, illustrates a blank usable to manufacture the inner layer of FIG. 8.
Figure 22:
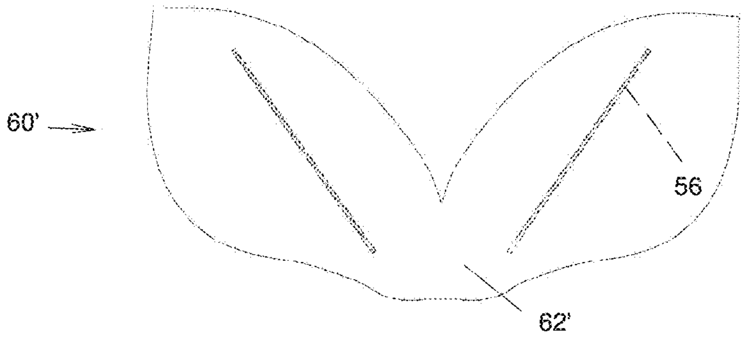
FIG. 22, in a top elevation view, illustrates a blank usable to manufacture the inner layer of FIG. 7.

FIGS. 7 and 8 illustrate respectively two alternative inner layers 44' and 44" that include respectively two frame members 56' and 56" that extend respectively vertically and horizontally across the inner layers 44' and 44". Such alternative inner layers 44' and 44" are manufactured from alternative blanks 60' and 60" shown in FIGS. 22 and 23 respectively and include frame members 56' and 56", which are rectilinear during manufacturing of the inner layers 44' and 44", as seen in FIGS. 17 and 19 respectively, and which achieve a shape that is curved when the spacing configuration is achieved, as seen in FIGS. 18 and 20 respectively.

Figure 14:
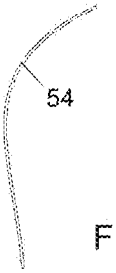
FIG. 14, in a top elevation view, illustrates the frame member of FIG. 12 in a mask manufacturing configuration.
Figure 24:
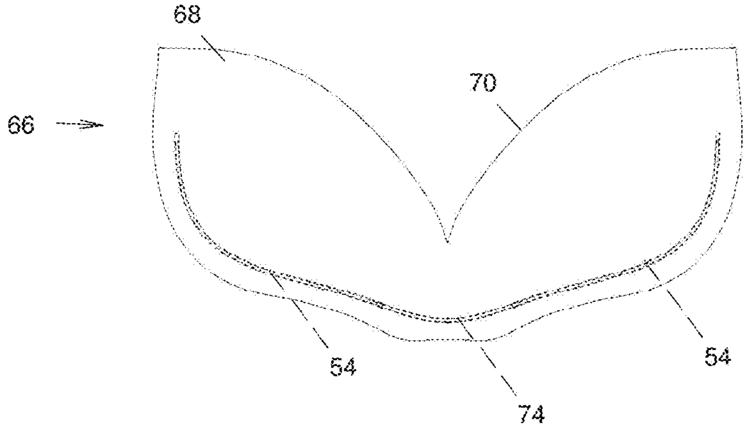
FIG. 24, in a top elevation view, illustrates a blank usable to manufacture the outer layer of FIG. 9.

Similarly, FIG. 24 illustrates a blank 66 usable to manufacture the outer layer 46. The blank 66 includes a fabric body 68 to which the frame members 54 are mounted. The frame members 54 achieve a fitting configuration when heated above a predetermined fitting temperature, that is for example and non-limitingly about 30° C. For example, the frame members 54 are substantially arcuate as seen in FIG. 14, prior to mounting. The frame members 54 have been trained to achieve the proper shape when in the fitting configuration prior to being formed for mounting to the fabric body 62. Part of the periphery of the fabric body 68 is a junction edge portion 70 that is folded over itself and sewn or otherwise secured in this folded configuration to form the outer layer 46 from the blank 66. The remainder of the periphery of the fabric body 68 is a free edge portion 72 that will be at the body peripheral edge 34 of the face mask 10 when the latter has been manufactured. Two similar frame members 54 are mounted in a laterally mirror symmetrical manner each along part of the free edge portion 72. Typically, gaps are provided at the top and bottom of the face mask 10, in the peripheral edge nose and chin portions 36 and 40. A resiliently deformable link 74 made of an elastic material extends between the frame members 54 along the body peripheral edge 34 in the peripheral edge nose portion 36, but in some embodiments the link 74 is omitted. In some embodiments, the frame members 54 are short of the junction edge portion 70 so that part of the chin portion 40 is devoid of the frame members 54. Typically, the frame members 54 extend along a major portion of the body peripheral edge 34.

Figure 11:
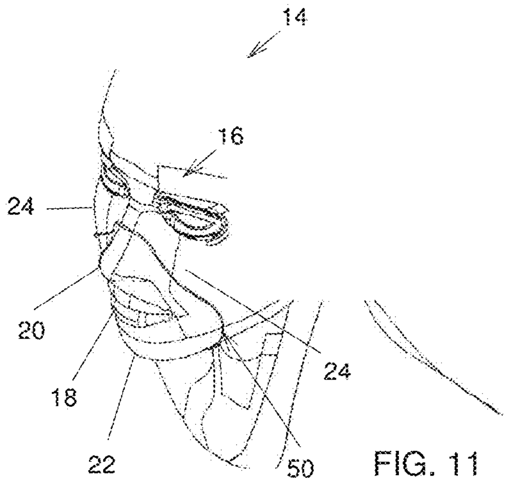
FIG. 11, in a perspective view, illustrates the fitting frame of FIG. 10 after deformation to a fitted configuration.
Figure 9:
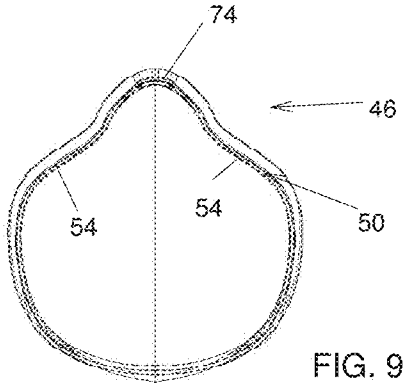
FIG. 9, in a front elevation view, illustrates an outer shell part of the body of the face mask of FIG. 1.
Figure 12:
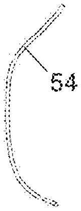
FIG. 12, in a side elevation view, illustrates a frame member part of the the fitting frame of FIG. 10 in the fitted configuration.
Figure 13:
FIG. 13, in a front elevation view, illustrates the frame member of FIG. 12 in the fitted configuration.

As seen in FIGS. 11, 12 and 13, the shape of the frame members 54 in the fitting configuration is a complex shape that has been optimized to fit faces 16 within a predetermined range of morphologies. Many different models of the face mask 10 having different dimensions and curvatures can be manufactured to that intended users having different morphologies can benefit from proper seal between the face mask 10 and their face 16. The straps 42 press the portions of the frame members 54 adjacent their attachment locations on the body 28, and the frame members 54 use these attachment locations as a fulcrum for the fitting members to act as levers pressing the body peripheral edge 34 against the face 16. Therefore, in the fitting configuration, the frame members 54 may not extend in a common plane, and instead have portions thereof that extend towards the back of the head 14 relative to the locations at which the straps 42 are attached.

In the fitting configuration, the link 74 may also be stretched to provide a better seal at the nose 20 to reduce or eliminate fogging of eyeglasses due to air exiting the face mask 10 around the nose 20 during expiration. The shape of the frame members 54 in the fitting configuration can be determined experimentally by fitting frame members 54 to many different faces and iterating their shape in response to seal performance between the face mask 10 and the face 16, or can be modelled on a computer using databases of face morphologies so that such seal is optimized. In some embodiments, the fitting configuration is only partway towards the configuration in which the frame members 54 would be in the absence of the face 16. Indeed, Nitinol and similar materials are superelastic and can deform over a relatively large deformation range. By having the frame members 54 only deformed partially towards a maximally deformed shape, due to the reaction forces exerted thereonto by the face 16, the spring back force thus created can maximize the seal against the face 16.

It should be noted that due to their shape memory properties, the fitting and spacing frames 50 and 52 will revert to their fitting and spacing configurations respectively if deformed while the face mask 10 is worn, for example due to accidental or voluntary contact between the face mask 10 and other objects.

In use, an intended user 12 inserts the filter layer 48 between the inner and outer layers 44 and 46, positions the body 28 over his face 16, so that the mouth and nose portions 30 and 32 cover respectively his mouth and nose 18 and 20 as seen in FIG. 10, and then wraps the straps 42 around his head 14 to secure the face mask 10 in place. At first, the frame members 54 may be spaced apart from large portions of the face 16, as seen in FIG. 10. However, then the frame members 54 are adjacent to the skin of the face 16, and due to the straps 42 biasing the frame members 54 towards the face 16, the frame members 54 will heat up by receiving heat from the face 16 and transition to the fitting configuration, as seen in FIG. 11. This happens without or with minimal user intervention to adjust seal, in opposition to conventional semi rigid masks that require the intended user to adjust a malleable strip part of conventional N95 respirators. Also, when the intended user breathes through the face mask 10, the frame members 56 will achieve the spacing configuration and maintain a cavity in front of the face 16, for example in front of the mouth 18 and nostrils of the nose 20.

If desired, after using the face mask 10, the filter layer 48 may be removed from the face mask 10, and the latter may be washed. A new filter layer 48 may then be mounted to the face mask 10, which is then reused.

Although the present invention has been described hereinabove by way of preferred embodiments thereof, it can be modified, without departing from the spirit and nature of the subject invention as defined in the appended claims.

What is claimed is:

1. A face mask for covering a nose and a mouth part of a face of a head of an intended user, the face mask comprising:

a body defining a mouth portion and a nose portion extending therefrom for respectively covering the mouth and the nose of the intended user when the face mask is operatively worn by the intended user, the body defining a body peripheral edge, the body including a deformable and flexible material, the body peripheral edge defining peripheral edge nose, cheek and chin portions configured to abut respectively against the nose, cheeks and chin of the face of the intended user when the face mask is operatively worn by the intended user, the body comprising a filter layer to filter particulates;

one or more support straps extending from the body and configured for mounting the body to the head of the intended user; and a frame mounted to the body, the frame being made of a temperature sensitive shape memory material, the frame being configured for deforming the deformable and flexible material so that at least part of the body adopts a predetermined shape when the frame is heated over a predetermined transition temperature, the frame comprising:

a pair of elongate fitting frames made from the temperature sensitive shape memory material, each fitting frame extending along at least the peripheral edge nose and cheek portions of the body peripheral edge along one side of the body, wherein the fitting frames are configured to contract against the face in response to receiving heat from the face when the face mask is operatively worn by the intended user and the fitting frames are heated above the predetermined transition temperature such that the fitting frames create a seal between the face mask and the face;

a resiliently deformable link extending between the fitting frames along the body peripheral edge in the nose portion; and a spacing frame provided on the mouth portion, the spacing frame being heat activated to achieve an activated configuration in which the mouth portion adopts a predetermined shape when the spacing frame is heated above the predetermined transition temperature to form a cavity in front of the mouth in response to receiving warm air exhaled by the intended user while the face mask is worn, causing the spacing frame to be heated above the predetermined transition temperature.

2. The face mask as defined in claim 1, wherein the fitting frames include two similar fitting frames mounted in a lateral mirror symmetry to the body with gaps therebetween both at a top portion of the face mask and at a bottom portion of the face mask.

3. The face mask as defined in claim 2, wherein the fitting frames together extend along a major portion of the body peripheral edge.

4. The face mask as defined in claim 1, therein the frame is arcuate in the activated configuration.

5. The face mask as defined in claim 1, wherein the body includes an inner layer, an outer layer, and wherein the filter layer is located between the inner and outer layers, the filter layer being less permeable to particulates than the inner and outer layers.

6. The face mask as defined in claim 5, wherein the inner and outer layer are movable relative to each other to allow replacement of the filter layer from between the inner and outer layers.

7. The face mask as defined in claim 6, wherein the inner and outer layers are hinged to each other through a hinge provided at the body peripheral edge and detached from each other along the body peripheral edge outside of the hinge.

8. The face mask as defined in claim 6, wherein the inner and outer layers are detached from each other.

9. The face mask as defined in claim 1, wherein the body is made entirely of the deformable and flexible material.

10. The face mask as defined in claim 1, wherein the deformable and flexible material includes a fabric.

11. The face mask as defined in claim 1, wherein the temperature sensitive shape memory material is a nickel-titanium alloy.

12. The face mask as defined in claim 1, wherein the temperature sensitive shape memory material is superelastic.

13. A method of using a face mask to be worn over a face of a head of an intended user, the method comprising:

positioning the face mask in front of the face to cover a nose and a mouth of the intended user, the face mask defining a body peripheral edge and a deformable and flexible material, the body peripheral edge defining peripheral edge nose, cheek and chin portions that abut respectively against the nose, cheeks and chin of the face of the intended user when the face mask is positioned in front of the face, the face mask comprising a filter layer to filter particulates; and using heat provided by the intended user, deforming a shape memory frame of the face mask so that a portion of the face mask adopts a predetermined shape to bias the body peripheral edge of the face mask against the face to create a seal between the face mask and the face, the shape memory frame comprising a pair of elongate fitting frames made from temperature sensitive shape memory material, each fitting frame extending along at least the peripheral edge nose and cheek portions of the body peripheral edge along one side of the face mask, and a resiliently deformable link extending between the fitting frames along the body peripheral edge in the nose portion, wherein the face mask further comprises a spacing frame provided at least in part in a mouth portion of the face mask, and heat activating the spacing frame to achieve an activated configuration in which the mouth portion forms a cavity in front of the mouth in response to receiving warm air exhaled by the intended user while the face mask is worn, causing the spacing frame to be heated above a predetermined transition temperature.

14. The method as defined in claim 13, further comprising removing a filter part of the face mask;

washing the face mask with the filter removed; and mounting a new filter to the face mask after washing.

15. The face mask of claim 1, wherein the spacing frame comprises a plurality of frame members mounted on the mouth portion of the body.

16. The face mask of claim 15, wherein the plurality of frame members are spaced inwardly from the body peripheral edge of the body.

17. The face mask of claim 15, wherein the plurality of frame members extend one or both of horizontally and vertically on the mouth portion.

18. The face mask of claim 15, wherein the plurality of frame members comprise one or more pairs of frame members arranged symmetrically on either side of the mouth portion.

* * * * *